C SUYDAM.
Bee Hive.
No 4,272. Patented Nov. 18, 1845.
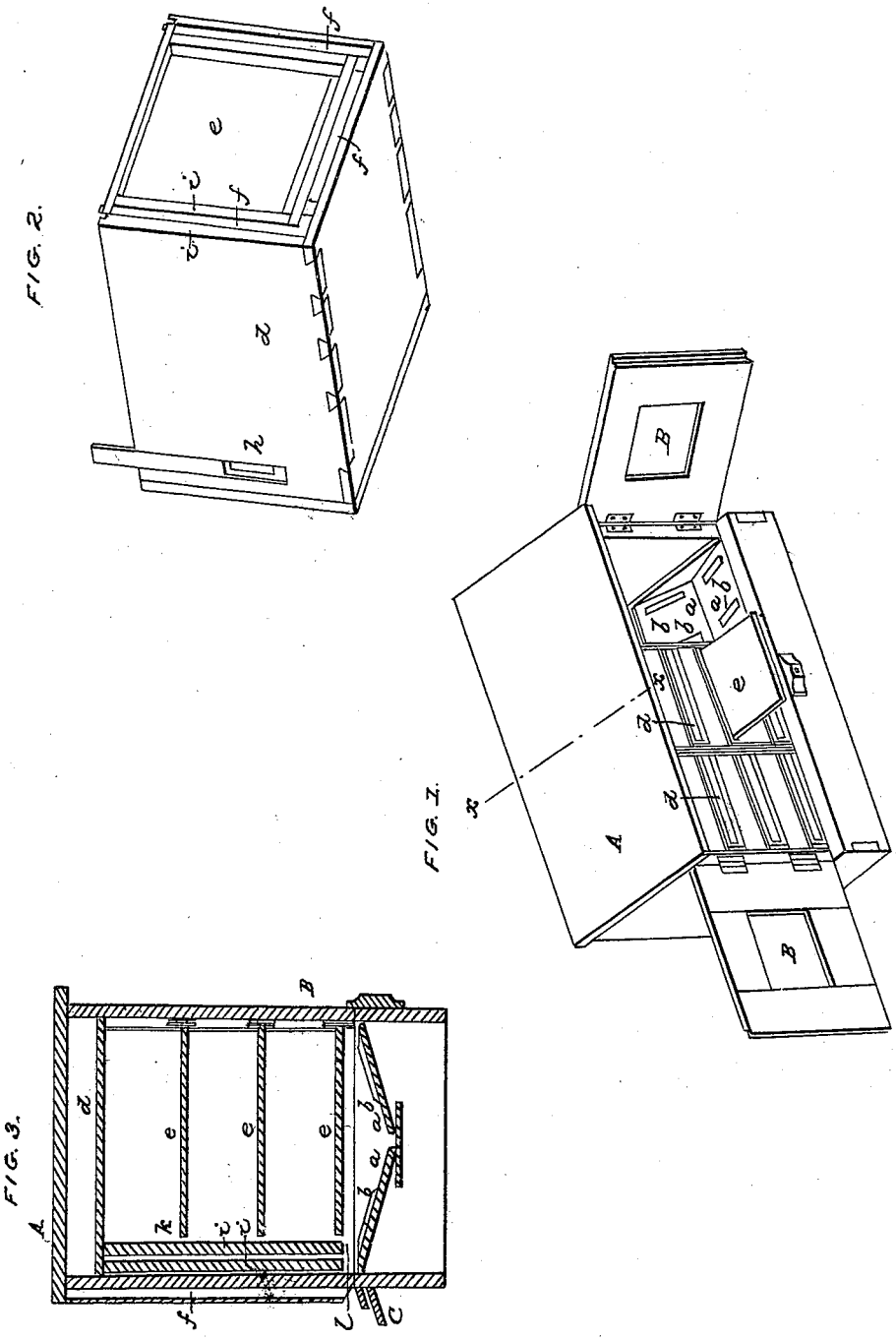

UNITED STATES PATENT OFFICE.

CHRISTOPHER SUYDAM, OF LAMBERTSVILLE, NEW JERSEY.

BEEHIVE.

Specification of Letters Patent No. 4,272, dated November 18, 1845.

*To all whom it may concern:*

Be it known that I, CHRISTOPHER SUYDAM, of Lambertsville, in the county of Hunterdon and State of New Jersey, have invented a new and useful Improvement in Beehives; and I do hereby declare that the following is a full, clear, and exact description thereof, reference being had to the accompanying drawing, which in Figure 1, represents an isometrical view of a hive composed of three drawers, one of the doors of said hive being open and a drawer removed to show the interior. Fig. 2 is a drawer turned up to show its construction. Fig. 3, is a section through the center of the hive on the line $x\,x$ of Fig. 1.

The nature of my improvements is in the manner of preventing the moth from working in the hive to the injury of the bees, and in the combination therewith of a convenient ingress to all parts of the drawers, each of which is divided into three compartments.

The hive is composed of an oblong box or house (A), having folding doors (B) on one side and on the opposite side there is an alighting board (C) with divisions to enter each drawer; the bottom is composed of two inclined planes ($a$, $a$) on which are fastened semi-tubes ($b$, $b$), with their concave surface toward the planes and extending from near the bottom up to near the top and opening under the space around the drawers hereafter named; the tubes are open at both ends; the two planes ($a$, $a$) do not meet at the center, a space being there left for dirt, &c., to fall through from the hive. The drawers ($d$, $d$, $d$) are arranged side by side in the outer box (A), and extend from the bottom to the top thereof; they are composed of a double shell ($i$) and ($i'$) on three sides, and on the fourth glasses are set, to see into the interior when required; they are each divided horizontally into three compartments, one above the other, by two slide boards ($e$, $e$) (see Fig. 3); these slides can be drawn out at pleasure, they do not extend back quite to the inner back partition ($i$), but a small space is left between them at ($k$), directly over the entrance ($l$) in the bottom, for the ingress and egress of the bees, to all parts of the drawers. Between the outer and inner shells ($i$, $i'$) above named on three sides of the hive, there is a space ($f$) left, (as shown in Fig. 2), wide enough for the bee moth to enter; this space is entirely isolated from the interior of the hive at the top and forms a receptacle for the moth, where it can deposit its eggs without injury to the comb in the hive; the only other entrance is the main passage ($l$) for the bees, which is generally kept guarded; the other being an equally acceptable one, which apparently reaches to the top of the hive, the moths will generally take to it in preference to the common entrance of the bees. In addition to these arrangements, I affix to the outside box a series of upright hollow pilasters or semi cylindrical tubes ($g$), open at the bottom just over the entrance, to which many of the moths will resort and thus being defeated from entering the hive. There are slides of tin that can be introduced into the drawers over the slides ($e$) which will reach back far enough to close the entrance space and thus cut off all communication with other parts of the hive, at pleasure; small openings ($h\,h$) are made in the sides of the drawers, to communicate from one drawer to another, and each of said openings is furnished with a closing slide.

Having thus fully described my improvements what I claim therein as new and for which I desire to secure Letters Patent is—

The combination of tubes $b$, $b$, as described on the inclined planes, with the double shell of the drawers in the manner and for the purposes set forth.

CHRISTOPHER SUYDAM.

Witnesses:
J. J. GREENOUGH,
JOHN MORGAN.